United States Patent Office 3,231,626
Patented Jan. 25, 1966

3,231,626
PREPARATION OF HALOGENATED COMPOUNDS
Murray Hauptschein, Glenside, Pa., and Milton Braid, Haddon Heights, N.J., assignors to Pennsalt Chemicals Corporation, Philadelphia, Pa., a corporation of Pennsylvania
No Drawing. Filed Sept. 25, 1962, Ser. No. 226,170
5 Claims. (Cl. 260—653)

This invention relates to a new method for the preparation of organic chlorides comprising the treatment of perfluorochlorocarbon iodides and perfluorocarbon iodides with chlorosulfonic acid.

This application is a continuation-in-part of application Serial No. 735,702, filed May 16, 1958, now abandoned.

In the ordinary production of organic chlorides from the corresponding iodides, chlorine is commonly employed. Elemental chlorine, being a gas at room temperature, is shipped commercially in a liquified state within pressure vessels as prescribed by the regulations of the Interstate Commerce Commission for the shipment of compressed gases. The vapor pressure of the element and the vessels required to contain it present problems both in handling and in required safety precautions.

Since chlorosulfonic acid is a liquid at room temperature which may be transported in vessels of comparatively light weight, the present invention, by permitting chlorination of certain compounds by use of chlorosulfonic acid, offers an advantage over previously used methods.

Additionally, quantitative control of chlorosulfonic acid during its addition to a reaction mix is more easily accomplished. Chlorine, if added to reaction mixtures as a gas, requires relatively cumbersome flow-measuring devices such as orifice-plate manometer assemblies. If added as a liquid, chlorine poses problems due to its tendency to vaporize and render volumetric or pressure-drop flow measurements inaccurate. Weighing of chlorine containers is not practicable for the addition of small quantities because the high tare weight of the chlorine pressure container requires the use of scales of relatively high capacity and consequent low sensitivity. Chlorosulfonic acid may be accurately weighed or measured volumetrically with standard laboratory or plant equipment, and thus the present invention offers an advantage over current methods.

In general the optimum temperature for the chlorination by chlorosulfonic acid of a particular fluorocarbon compound will be between 20° and 250° C. However, as demonstrated by the examples, the range of 75° C. to about 200° C. is to be preferred for most compounds. As further illustrated by Examples 1 and 2, reaction temperature has an effect on the efficiency of the conversion of the iodide to the chloride with higher yields occurring at higher temperatures within the stated range. Examples 4 and 5 illustrate temperatures of about 150° C. and about 100° C. respectively. In commercial production, temperature would necessarily be optimized for each specific compound.

Pressure changes have no major effect on the chlorination reactions. The reaction may be conducted in the liquid or vapor stage and the pressure may range from atmospheric to above 1000 pounds per square inch.

The reactions may be conducted either in batches or continuously with reactants constantly being added and products constantly removed from the reaction zone.

Of the perfluorocarbon iodides (compounds containing only carbon, fluorine and iodine) and perfluorochlorocarbon iodides (compounds containing only carbon, fluorine, chlorine and iodine) the preferred reactants are perfluorocarbon iodides and those perfluorochlorocarbon iodides which contain at least as many moles of fluorine as of chlorine. Of these perfluoroalkyl iodides and perfluorochloroalkyl iodides are more preferred. Also, because the secondary and tertiary iodides give better yields of the chlorides, they are preferred over the primary iodides.

Examples of typical compounds which may be chlorinated by chlorosulfonic acid include, but are not limited to, the following:

$CF_3I$
$CF_2ClI$
$CFCl_2I$
$CF_3CF_2I$
$CF_2ClCF_2I$
$CFCl_2CF_2I$
$CF_2ClCFClI$
$CF_2ClCCl_2I$
$CF_3CFICF_3$
$CF_3CFICF_2I$
$C_2F_5CFICF_3$
$C_4F_9CFICF_3$
$CF_2ClCClICF_3$
$CF_3CF_2CF_2I$
$CF_3CF_2CFClI$
$CF_3CF_2CCl_2I$
$CF_2ClCF_2CCl_2I$
$CF_2ClCF_2CF_2I$
$CFCl_2CF_2CF_2I$
$CF_3CFClI$
$ICF_2CF_2I$
$CF_3CCl_2I$
$ICF_2CF_2CF_2I$
$CF_2ClCFICF_3$
$CF_2ClCFICF_2Cl$
$(CF_3)_3C-I$

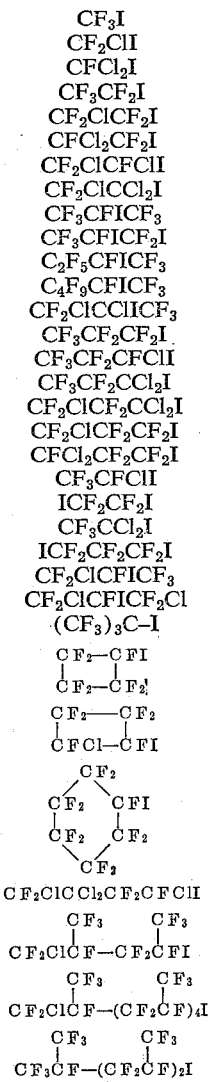

$CF_2ClCCl_2CF_2CFClI$ $$CF_2ClCF-CF_2CFI \\ \;\;\;\;|\;\;\;\;\;\;\;\;\;\;| \\ \;\;\;CF_3\;\;\;\;\;\;\;CF_3$$

$$CF_2ClCF-(CF_2CF)_4I \\ \;\;\;\;|\;\;\;\;\;\;\;\;\;\;\;\;\;\;| \\ \;\;\;CF_3\;\;\;\;\;\;\;\;\;\;CF_3$$

$$CF_3CF-(CF_2CF)_2I \\ \;\;|\;\;\;\;\;\;\;\;\;\;\;\;| \\ CF_3\;\;\;\;\;\;\;CF_3$$

While the following examples will further illustrate the invention, they should be understood to restrict it in no respect.

*Example 1.*—Thermal reaction of 1-iodoperfluoropropane ($C_3F_7I$) with chlorosulfonic acid 50 grams (0.429 mole) of chlorosulfonic acid and 11.8 grams (0.0399 mole) of 1-iodoperfluoropropane are sealed under a dry, high purity nitrogen atmosphere in a 70 cubic centimeter heavy wall Pyrex ampule. The tube is shaken and heated to a temperature of 130° C. for 65 hours. The tube contents are a mixture of dark liquid and orange crystals of iodine trichloride ($ICl_3$). After cooling in solid carbon dioxide, the ampule is opened and warmed to room temperature. The volatiles evolved during warming are passed through aqueous neutral potassium permanganate solution to remove sulfur dioxide, dried over anhydrous calcium sulfate, and finally condensed in a refrigerated trap, where there is collected 0.9 gram (0.0044 mole) of n-$C_3F_7Cl$, which is identified by its infra-red spectrum. The conversion to, and yield of n-$C_3F_7Cl$, based on the starting iodide is 11%. Distillation of the remaining liquid portion yields 10.7 g. of n-perfluoropropyl chlorosulfate, equivalent to 89% conversion.

*Example 2.—Reaction of 1-iodoperfluoropropane with chlorosulfonic acid*

In a second reaction, 15 g. (0.0507 mole) of 1-iodoperfluoropropane and 25 g. (0.215 mole) of chlorosulfonic acid are heated in a sealed tube at 155° for 2 hours with shaking. There are obtained 4.5 g. of $C_3F_7Cl$ (46% yield, 43% conversion) and 7 g. of $C_3F_7OSO_2Cl$, 52% yield, 49% conversion, and 0.9 g. of $C_3F_7I$.

*Example 3.—Reaction of 1,1-dichloro-1,2,2-trifluoro-2-iodoethane with chlorosulfonic acid*

Thirty grams (0.108 mole) of the iodide 1,1-dichloro-1,2,2-trifluoro-2-iodoethane, $CFCl_2CF_2I$, is added drop by drop during one-half hour to 70 grams (0.601 mole) of chlorosulfonic acid while stirring. During the addition, the reaction temperature is gradually raised until the liberation of iodine and the evolution of $SO_2$ is observed at 100° C. after the addition of about 8 grams of the iodide. The addition is completed, and the reaction mixture is then stirred for 2 hours longer at 100° C. After cooling, the contents of the flask are poured onto chipped ice and the lower layer is separated, washed once with cold water, dried with a mixture of calcium and magnesium sulfates, and distilled in a small still packed with glass helices. There is collected 1,1-dichlorotrifluoroethyl chlorosulfate and a small amount of 1,1,2-trichlorotrifluoroethane.

*Example 4.—Reaction of 2-iodoperfluorohexane with chlorosulfonic acid*

20 grams (0.17 mole) of chlorosulfonic acid and 5 grams (0.0112 mole) of the secondary perfluoroiodide $CF_3CF_2CF_2CF_2CFICF_3$ are sealed in a heavy walled Pyrex ampule and heated at 148° C. for 112 hours. A mass of orange crystals of iodine trichloride form at the bottom of the tube. The tube is then cooled and opened and the top layer, a clear yellow oil, is decanted. On warming to room temperature, sulfur dioxide gas is evolved. A small amount of additional oil is collected on hydrolysis of the iodine trichloride-acid layer, combined with the main fraction, washed with dilute potassium carbonate solution, dried with anhydrous calcium sulfate, and distilled to give 4 g. (100% yield) of 2-chloroperfluorohexane, $CF_3CF_2CF_2CF_2CFClCF_3$, having a boiling point of 83° to 84° C., and a refractive index $n_D^{26}$ 1.2826. No chlorosulfate appears to be formed in this reaction.

*Example 5.—Reaction of perfluoro-tert-butyl iodide with chlorosulfonic acid*

Similarly, $(CF_3)_3C—I$ is reacted with an excess of chlorosulfonic acid at 100° C. to produce the tertiary chloride $(CF_3)_3CCl$ in good yield.

*Example 6.—Reaction of 1-iodo-1,3,3,4-tetrachloro-perfluorobutane with chlorosulfonic acid*

Thirty-five grams (0.085 mole) of the telomer iodide $CF_2ClCCl_2CF_2CFClI$ is added, drop-by-drop over 1.5 hours while stirring, to 49.5 g. (0.425 mole) of chlorosulfonic acid at a temperature of 50 to 55° C. The reaction mixture is then heated and stirred at 50 to 55° C. for two additional hours. After cooling, the reaction mixture is poured onto crushed ice and, after filtration to remove 10.5 g. of crystalline iodine, the lower organic layer is separated and distilled. Conversions to the chlorosulfate and chloride were 59% and 12% respectively.

It will be understood that the above description and examples are merely illustrative and that numerous changes and variations may be made without departing from the spirit and scope of the invention.

We claim:

1. The method of preparing fluorocarbon chlorides which comprises reacting at a temperature from about 20° to about 250° C. chlorosulfonic acid with a 1 to 8 carbon atom perfluoroalkyl iodide selected from the group consisting of secondary and tertiary iodides, and isolating as a major product of the reaction a fluorocarbon chloride.

2. The method of claim 1 wherein the defined iodide is a secondary iodide.

3. The method of claim 1 wherein the defined iodide is a tertiary iodide.

4. The method of preparing 2-chloroperfluorohexane which comprises reacting 2-iodoperfluorohexane with chlorosulfonic acid at about 150° C. and isolating 2-chloroperfluorohexane as the major reaction product.

5. The method of preparing perfluoro-tertiary-butyl chloride which comprises reacting perfluoro-tertiary-butyl iodide with chlorosulfonic acid at about 100° C. and isolating perfluoro-tertiary-butyl chloride as the major reaction product.

References Cited by the Examiner

UNITED STATES PATENTS 3,002,031   9/1961   Hauptschein et al. __ 260—653.8

OTHER REFERENCES

Haszeldine, J. Chem. Soc. 1951, 2495.
Haszeldine, J. Chem. Soc. 1952, 2512.
Haszeldine, J. Chem. Soc. 1954, 4027.
Haszeldine et al., J. Chem. Soc. 1953, 1199.
Haszeldine et al., J. Chem. Soc. 1953, 1593.
Klarmann et al., Chemical Abstracts 47, 586g (1953), citing Klarmann, Seifen Oel, Fette Wachse 78, 18 (1952).

LEON ZITVER, *Primary Examiner.*

DANIEL D. HORWITZ, *Examiner.*